No. 645,591. Patented Mar. 20, 1900.
W. T. FITZPATRICK.
COMBINATION INKSTAND.
(Application filed Apr. 17, 1899.)
(No Model.)
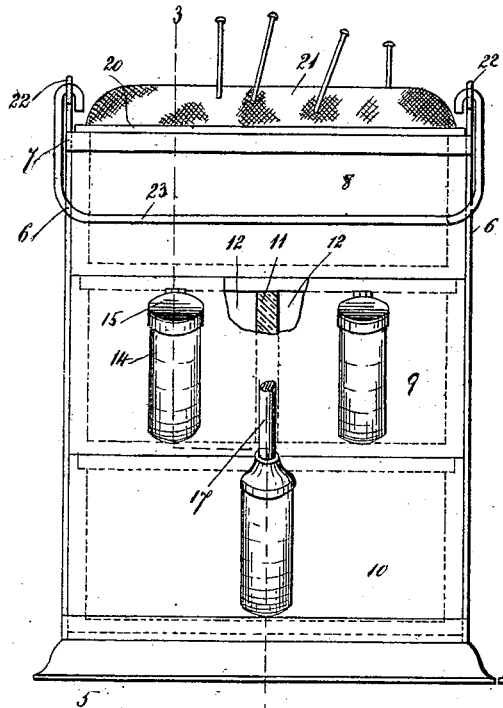
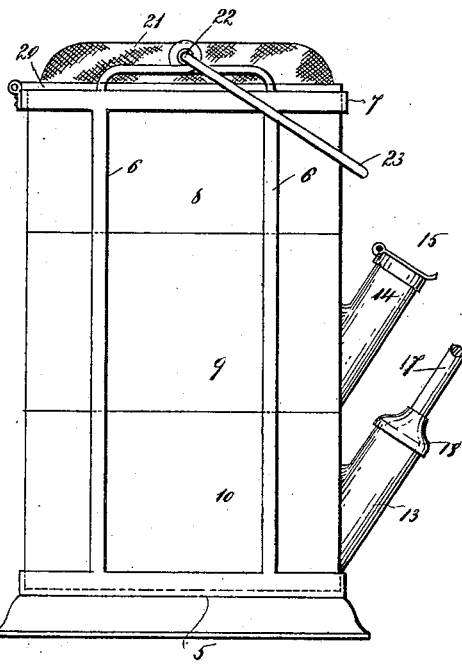
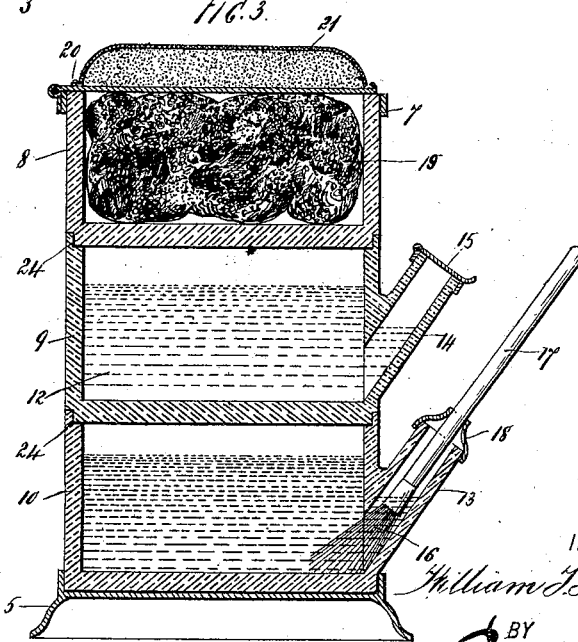
WITNESSES
INVENTOR
William T. Fitzpatrick
BY
ATTORNEYS

UNITED STATES PATENT OFFICE.

WILLIAM T. FITZPATRICK, OF NEW YORK, N. Y.

COMBINATION-INKSTAND.

SPECIFICATION forming part of Letters Patent No. 645,591, dated March 20, 1900.

Application filed April 17, 1899. Serial No. 713,288. (No model.)

*To all whom it may concern:*

Be it known that I, WILLIAM T. FITZPATRICK, a citizen of the United States, residing at New York, (Brooklyn,) in the county of Kings and State of New York, have invented certain new and useful Improvements in Combination-Inkstands, of which the following is a full and complete specification, such as will enable those skilled in the art to which it appertains to make and use the same.

This invention relates to inkstands; and one object thereof is to provide an improved device of this class consisting of detachable parts forming separate reservoirs adapted to receive inks of different colors and mucilage, a further object being to provide a combination-inkstand and mucilage and sponge holder comprising a plurality of parts arranged one above another in a suitable frame, the upper part, which constitutes the sponge-holder, being provided with a hinged cover so formed or constructed as to serve as a pincushion; and with these and other objects in view the invention consists in the construction, combination, and arrangement of parts hereinafter described and claimed.

The invention is fully disclosed in the following specification, of which the accompanying drawings form a part, in which—

Figure 1 is a side elevation of my improved combination-inkstand; Fig. 2, a similar view at right angles to Fig. 1, and Fig. 3 a section on the zigzag line 3 3 of Fig. 1.

In the drawings forming part of this specification the separate parts of my improvement are designated by the same numerals of reference in each of the views, and in the practice of my invention I provide a frame comprising a base 5, vertical strips 6, and a top band 7. I also provide a plurality of reservoirs or receptacles 8, 9, and 10, which are similar in form, the bottom reservoir or receptacle 10 being preferably designed to serve as a mucilage-holder, the central reservoir or receptacle 9 to serve as an ink-holder, and the top reservoir or receptacle 8 to serve as a sponge-holder. The central reservoir or receptacle 9 is divided centrally by a transverse partition 11, whereby two separate supplemental receptacles or reservoirs 12 are formed, and these receptacles or reservoirs 12 are designed to serve one for the purpose of holding black and the other red ink. The bottom receptacle or reservoir 10 is provided at one side with an upwardly-directed nozzle 13, and each of the supplemental reservoirs or receptacles 12 is provided on the same side with a corresponding upwardly-directed nozzle 14, each of which is preferably provided with a hinged cover 15. I have also shown a mucilage-brush 16, provided with a handle 17 and adapted to be inserted into the nozzle 13 of the bottom reservoir or receptacle, and the handle 17 of the brush 16 is provided with a cup-shaped collar 18 for closing the nozzle 13.

A cover 20, on the upper side of which is placed a pincushion 21, is hinged to the top band 7 of the frame in which the separate reservoirs are placed, and said hinged cover 20 is arranged to close down over the sponge receptacle or reservoir 8. The said top band 7 of the frame is also provided at each side with ears or other fastening devices 22, with which an ordinary bail 23 is preferably connected.

The bottom reservoirs or receptacles 9 and 10 are provided in the tops thereof with rabbet-grooves 24, and the bottoms of the reservoirs 8 and 9 are so formed as to fit in these grooves, as clearly shown in Fig. 3. This arrangement keeps the separate reservoirs stationary and immovable, and by means thereof the reservoir or receptacle 9 is made to serve as a close cover or cap for the reservoir 10, and the reservoir or receptacle 8 as a corresponding cover or cap for the reservoir or receptacle 9.

As shown in the drawings, the separate reservoirs or receptacles are oblong and rectangular in form, and the vertical strips 6 of the frame are at the ends only of said reservoirs or receptacles; but said reservoirs or receptacles may be of any desired form, and the strips 6 may be placed both at the front and back as well as at the sides thereof.

Having fully described my invention, I claim as new and desire to secure by Letters Patent—

A combination device of the class described, comprising a frame consisting of a base portion, three receptacles superimposed therein the lower of which is provided with an upwardly-directed nozzle in which fits a brush, the intermediate of which receptacles is transversely divided to form two reservoirs each of which is provided with an upwardly-directed nozzle and the uppermost of which receptacles is arranged to receive a sponge, a frame consisting of uprights connected with said base and between which said receptacles are superimposed said frame being provided with a top rim, to which is hinged a cover provided with a pincushion, and a bail connected with said rim, substantially as shown and described.

In testimony that I claim the foregoing as my invention I have signed my name, in presence of the subscribing witnesses, this 15th day of April, 1899.

WILLIAM T. FITZPATRICK.

Witnesses:
EDWARD HARTUNG,
WILLIAM J. FITZPATRICK,
WILLIAM McNIFF.